United States Patent
Sun et al.

(10) Patent No.: US 11,576,187 B2
(45) Date of Patent: Feb. 7, 2023

(54) RADIO FREQUENCY RESOURCE ALLOCATION METHOD, APPARATUS, DEVICE AND SYSTEM, AND STORAGE MEDIUM

(71) Applicant: HUAWEI TECHNOLOGIES CO., LTD., Shenzhen (CN)

(72) Inventors: Zhenhang Sun, Nanjing (CN); Dewei Bao, Nanjing (CN); Qikun Wei, Nanjing (CN); Xiaofei Bai, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 16/993,247

(22) Filed: Aug. 13, 2020

(65) Prior Publication Data
US 2021/0051677 A1    Feb. 18, 2021

(30) Foreign Application Priority Data

Aug. 14, 2019  (CN) .......................... 201910750041.5
Sep. 12, 2019  (CN) .......................... 201910866855.5

(51) Int. Cl.
H04W 72/04 (2009.01)
H04W 72/08 (2009.01)
H04L 5/00 (2006.01)
H04W 72/12 (2009.01)
H04W 84/12 (2009.01)

(52) U.S. Cl.
CPC ......... H04W 72/082 (2013.01); H04L 5/0032 (2013.01); H04W 72/0486 (2013.01); H04W 72/1231 (2013.01); H04W 84/12 (2013.01)

(58) Field of Classification Search
None
See application file for complete search history.

(56) References Cited

U.S. PATENT DOCUMENTS

| | | | |
|---|---|---|---|
| 2011/0304503 A1* | 12/2011 | Chintalapudi | G01S 11/06 342/357.29 |
| 2012/0307750 A1 | 12/2012 | Hunukumbure et al. | |
| 2016/0119816 A1 | 4/2016 | Yasukawa et al. | |
| 2017/0026263 A1* | 1/2017 | Gell | H04L 67/1023 |
| 2017/0026888 A1* | 1/2017 | Kwan | H04W 24/10 |
| 2017/0272310 A1* | 9/2017 | Rengarajan | H04L 41/147 |

(Continued)

FOREIGN PATENT DOCUMENTS

| | | | |
|---|---|---|---|
| CN | 103596253 A | * | 2/2014 |
| CN | 104349480 A | | 2/2015 |

(Continued)

*Primary Examiner* — The Hy Nguyen

(57) ABSTRACT

Embodiments of this application disclose a radio frequency resource allocation method, apparatus, device, system, and a storage medium. The method includes: obtaining radio frequency information of an access point AP (for example, RSSI signal strength between the AP and each neighboring AP, and data traffic of the AP in a data collection period), predicting, based on the radio frequency information of the AP, load of the AP that is in target duration after a current moment, and allocating a radio frequency resource to the AP based on the load of the AP. This implementation can reduce actual interference on an entire network and improve user experience.

17 Claims, 4 Drawing Sheets

(56) References Cited

U.S. PATENT DOCUMENTS

2019/0190852 A1\* 6/2019 Zhang ...................... G06F 3/06
2020/0257568 A1\* 8/2020 Watanabe ............. H04L 47/823

FOREIGN PATENT DOCUMENTS

| CN | 105491569 A | 4/2016 |
| CN | 109565716 A | 4/2019 |
| CN | 109660995 A | 4/2019 |
| EP | 3462794 A1 | 4/2019 |
| JP | 2019512992 A | 5/2019 |
| WO | 2015024194 A1 | 2/2015 |
| WO | 2017161260 A2 | 9/2017 |

\* cited by examiner

RADIO FREQUENCY RESOURCE ALLOCATION METHOD, APPARATUS, DEVICE AND SYSTEM, AND STORAGE MEDIUM

CROSS-REFERENCE TO RELATED APPLICATIONS

This application claims priority to Chinese Patent Application No. 201910750041.5, filed on Aug. 14, 2019 and Chinese Patent Application No. 201910866855.5, filed on Sep. 12, 2019. Both of the aforementioned applications are hereby incorporated by reference in their entireties.

TECHNOLOGY

This application relates to the field of communications technologies, and in particular, to a radio frequency resource allocation method, apparatus, device and system, and a storage medium.

BACKGROUND

With popularization of terminals, wireless local area network (WLAN) services are explosively increasing. More enterprise applications are deployed on mobile terminals, and more key enterprise applications are transferred to enterprise WLAN networks. Therefore, the WLAN networks rapidly increase in market value. However, spectrum resources are limited (13 channels), and in actual network deployment, a quantity of neighboring access points (AP) of each AP is usually more than 20. This causes a problem of co-channel interference between APs. Interference is a primary factor that affects user experience. Therefore, WLAN vendors focus on how to allocate global radio frequency resources such as AP channels and frequency bandwidths to reduce interference and increase a user rate.

In a radio frequency resource allocation manner provided in a related technology, network topology information (received signal strength indicator (RSSI) information between APs, power, and the like) is periodically collected. Then, the APs are sorted based on the collected network topology information, and a channel is sequentially allocated to each AP based on a sorting result. An allocation process is to resolve a combination optimization issue, to achieve a minimum RSSI sum in a combination. Finally, the frequency bandwidth is allocated. If an AP has an idle secondary channel, in other words, a neighbor of the AP does not occupy the secondary channel, the frequency bandwidth can be increased for the AP.

However, in the related technology, only RSSI information of a neighboring AP is considered during radio frequency resource allocation, and the RSSI information can reflect only possible interference. Therefore, when an RSSI-related indicator is used as an optimization indicator, although the RSSI-related indicator is optimized, actual interference usually does not decrease, but even increases.

SUMMARY

Embodiments of this application provide a radio frequency resource allocation method, apparatus, device, and system, and a storage medium, to reduce real interference of an entire network and improve experience.

According to a first aspect, a radio frequency resource allocation method is provided. The method includes: obtaining radio frequency information of a plurality of access points APs; for any AP in the plurality of APs, predicting, based on radio frequency information of the any AP, load of the any AP that is in target duration after a current moment; and allocating a radio frequency resource to each of the plurality of APs based on load of the plurality of APs, where the radio frequency resource includes one or a combination of a frequency bandwidth and a channel. The load of the AP is predicted based on the radio frequency information of the AP, and the radio frequency resource is allocated to the AP based on the load. This reduces interference on an entire network and improves user experience.

In an example embodiment, the radio frequency information of the any AP in the plurality of APs includes received signal strength indicator RSSI information between the any AP and each neighboring AP, and user usage data of the any AP. Because an RSSI and the user usage data can reflect the load of the AP, after the radio frequency information including the RSSI information and the user usage data is reported, the predicted load is more accurate.

In an example embodiment, the user usage data of the any AP includes data traffic of the any AP in a data collection period. Because the data traffic may be used to reflect the load of the AP, after the data traffic is reported as the radio frequency information, the load predicted based on the radio frequency information is more accurate.

In an example embodiment, the user usage data of the any AP includes channel utilization and an interference rate of the any AP in the data collection period. Because the data traffic may be obtained by using the channel utilization and the interference rate, and the data traffic may be used to reflect the load of the AP, after the channel utilization and the interference rate are used as the radio frequency information, and the load predicted based on the radio frequency information is more accurate.

In an example embodiment, the predicting, based on radio frequency information of the any AP, load of the any AP that is in target duration after a current moment includes: determining a historical load indicator of the any AP based on the radio frequency information of the any AP, where the historical load indicator includes one or a combination of a first historical load indicator and a second historical load indicator, the first historical load indicator of the any AP is used to indicate a quantity of traffic rates of the any AP that are in the data collection period and that exceed a reference threshold, the second historical load indicator is used to indicate an average traffic rate of the any AP in the data collection period, and the first historical load indicator and the second historical load indicator are used to describe historical load of the any AP; and predicting, based on the historical load indicator of the any AP, a predicted load indicator of the any AP in the target duration after the current moment, where the predicted load indicator includes one or a combination of a first predicted load indicator and a second predicted load indicator, and the first predicted load indicator and the second predicted load indicator are used to describe predicted load of the any AP. Because the quantity of traffic rates of the any AP that are in the data collection period and that exceed the reference threshold and the average traffic rate of the any AP in the data collection period may be used to reflect the load of the AP, the load predicted based on the quantity of traffic rates of the any AP and the average traffic rate of the any AP is more accurate.

In an example embodiment, the determining a historical load indicator of the any AP based on the radio frequency information of the any AP includes: when the historical load indicator of the any AP includes the first historical load indicator, determining the first historical load indicator count of the any AP based on the radio frequency information of the any AP and the following formula:

Count=$\Sigma I$(speed>threshold); and/or when the historical load indicator of the any AP includes the second historical load indicator, determining the second historical load indicator load of the any AP based on the radio frequency information of the any AP and the following formula:

$$\text{Load} = \frac{1}{m}\sum \text{speed}_n,$$

where the speed is the traffic rate of the any AP, the threshold is the reference threshold, m is a total quantity of data in the data collection period, n is a positive integer greater than 1 and less than m, when the speed>the threshold, a value of I is a first value, when the speed≤the threshold, the value of I is a second value, and if the first value is greater than the second value, a larger count indicates larger load, or if the first value is less than the second value, a larger count indicates smaller load.

In an example embodiment, the first value is 1, and the second value is 0.

In an example embodiment, the allocating a radio frequency resource to each of the plurality of APs based on load of the plurality of APs includes: grading and sorting the plurality of APs based on the first predicted load indicators of the plurality of APs, and sorting APs at a same level based on the second predicted load indicators, to obtain a sorting result of the plurality of APs; and allocating the radio frequency resource to each of the plurality of APs based on the sorting result of the plurality of APs. The plurality of APs are sorted based on the load of the plurality of APs, and the radio frequency resource is allocated based on the sorting result, so that the allocated resource is more proper, and interference is reduced.

In an example embodiment, the radio frequency resource includes the frequency bandwidth, and the allocating the radio frequency resource to each of the plurality of APs based on the sorting result of the plurality of APs includes: determining a quantity of allocable target frequency bandwidths based on one or more of a quantity of the plurality of APs, available channel data, and a deployment environment; and allocating a frequency bandwidth resource to each of the plurality of APs based on the quantity of target frequency bandwidths and the sorting result of the plurality of APs. The quantity of allocated bandwidths is determined based on the quantity of the plurality of APs, the available channel data, and the deployment environment, and then the resource is allocated based on the sorting result, so that an allocation result is more accurate.

In an example embodiment, the radio frequency resource includes a channel, and the allocating the radio frequency resource to each of the plurality of APs based on the sorting result of the plurality of APs includes: allocating an initial channel to each of the plurality of APs based on the sorting result of the plurality of APs; calculating an interference sum of each branch based on the initial channels allocated to the plurality of APs, where each branch is obtained through combination based on the initial channels allocated to the plurality of APs; and selecting a minimum interference sum from the interference sums obtained through calculation, and using an initial channel corresponding to a branch of the minimum interference sum as a channel allocation result of the plurality of APs. A channel resource is allocated based on the minimum interference sum. This further reduces interference.

In an example embodiment, the calculating an interference sum of each branch based on the initial channels allocated to the plurality of APs includes: for any branch of the branches obtained by combining the plurality of APs, calculating an interference sum of the any branch based on the initial channels allocated to the plurality of APs and the following formula:

Interference sum of the any branch=$\Sigma_{i,j}$(load[$AP_i$]+ load[$AP_j$])$\delta$[$AP_i,AP_j$]RSSI[$AP_i,AP_j$], where $\delta$[$AP_i$, $AP_j$] indicates whether there is channel overlapping between the $AP_i$ and the $AP_j$; and RSSI [$AP_i$, $AP_j$] indicates whether there is a neighbor relationship between the $AP_i$ and the $AP_j$, and i and j are used to identify different APs in the any branch.

In an example embodiment, third-party interference also needs to be considered for channel allocation. If a third-party interference source is detected in a network and interference of the third-party interference source is severe, the third-party interference source needs to be avoided. In this case, a channel used by the third-party interference source is not used for the channel allocation. In other words, a cloud analyzer detects whether there is the third-party interference source. If there is the third-party interference source, the cloud analyzer determines a channel used by the third-party interference source. The channel used by the third-party interference source is not allocated when a channel is allocated to an AP, to reduce interference caused by the third-party interference source to the AP.

In an example embodiment, after the allocating a radio frequency resource to each of the plurality of APs based on load of the plurality of APs, the method further includes: obtaining network usage of the plurality of APs in the currently allocated radio frequency resource; and comparing and evaluating the network usage of the plurality of APs in the currently allocated radio frequency resource with network usage of the plurality of APs before the currently allocated radio frequency resource, and obtaining a comparison evaluation indicator, where the comparison evaluation indicator is used to reflect a gain brought by the currently allocated radio frequency resource.

In an example embodiment, after the obtaining a comparison evaluation indicator, the method further includes: optimizing, based on the comparison evaluation indicator, a parameter used for allocating the radio frequency resource. After the comparison evaluation indicator is obtained based on the currently allocated radio frequency resource, the parameter used for allocating the radio frequency resource is optimized based on the comparison evaluation indicator, so that the radio frequency resource is subsequently allocated based on the optimized parameter, to further reduce interference.

According to a second aspect, a radio frequency resource allocation apparatus is provided, where the apparatus includes:

an obtaining module, configured to obtain radio frequency information of a plurality of access points APs;

a prediction module, configured to: for any AP in the plurality of APs, predict, based on radio frequency information of the any AP, load of the any AP that is in target duration after a current moment; and an allocation module, configured to allocate a radio frequency resource to each of the plurality of APs based on load of the plurality of APs, where the radio frequency resource includes one or a combination of a frequency bandwidth and a channel.

In an example embodiment, the radio frequency information of the any AP in the plurality of APs includes received signal strength indicator RSSI information between the any AP and each neighboring AP, and user usage data of the any AP.

In an example embodiment, the user usage data of the any AP includes data traffic of the any AP in a data collection period.

In an example embodiment, the user usage data of the any AP includes channel utilization and an interference rate of the any AP in the data collection period.

In an example embodiment, the prediction module is configured to: determine a historical load indicator of the any AP based on the radio frequency information of the any AP, where the historical load indicator includes one or a combination of a first historical load indicator and a second historical load indicator, the first historical load indicator of the any AP is used to indicate a quantity of traffic rates of the any AP that are in the data collection period and that exceed a reference threshold, the second historical load indicator is used to indicate an average traffic rate of the any AP in the data collection period, and the first historical load indicator and the second historical load indicator are used to describe historical load of the any AP; and predict, based on the historical load indicator of the any AP, a predicted load indicator of the any AP in the target duration after the current moment, where the predicted load indicator includes one or a combination of a first predicted load indicator and a second predicted load indicator, and the first predicted load indicator and the second predicted load indicator are used to describe predicted load of the any AP.

In an example embodiment, the prediction module is configured to: when the historical load indicator of the any AP includes the first historical load indicator, determine the first historical load indicator count of the any AP based on the radio frequency information of the any AP and the following formula:

Count=$\Sigma I$(speed>threshold); and/or when the historical load indicator of the any AP includes the second historical load indicator, determine the second historical load indicator load of the any AP based on the radio frequency information of the any AP and the following formula:

$$Load = \frac{1}{m}\sum speed_n,$$

where the speed is the traffic rate of the any AP, the threshold is the reference threshold, m is a total quantity of data in the data collection period, n is a positive integer greater than 1 and less than m, when the speed>the threshold, a value of I is a first value, when the speed≤the threshold, the value of I is a second value, and if the first value is greater than the second value, a larger count indicates larger load, or if the first value is less than the second value, a larger count indicates smaller load.

In an example embodiment, the first value is 1, and the second value is 0.

In an example embodiment, the allocation module is configured to: grade and sort the plurality of APs based on the first predicted load indicators of the plurality of APs, and sort APs at a same level based on the second predicted load indicators, to obtain a sorting result of the plurality of APs; and allocate the radio frequency resource to each of the plurality of APs based on the sorting result of the plurality of APs.

In an example embodiment, the radio frequency resource includes the frequency bandwidth, and the allocation module is configured to: determine a quantity of allocable target frequency bandwidths based on one or more of a quantity of the plurality of APs, available channel data, and a deployment environment, and allocate a frequency bandwidth resource to each of the plurality of APs based on the quantity of target frequency bandwidths and the sorting result of the plurality of APs.

In an example embodiment, the radio frequency resource includes the channel, and the allocation module is configured to: allocate an initial channel to each of the plurality of APs based on the sorting result of the plurality of APs; calculate an interference sum of each branch based on the initial channels allocated to the plurality of APs, where each branch is obtained through combination based on the initial channels allocated to the plurality of APs; select a minimum interference sum from the interference sums obtained through calculation, and use an initial channel corresponding to a branch of the minimum interference sum as a channel allocation result of the plurality of APs.

In an example embodiment, the allocation module is configured to: for any branch, calculate an interference sum of the any branch based on the initial channels allocated to the plurality of APs and the following formula:

Interference sum of the any branch=$\Sigma_{i,j}$(load[$AP_i$]+ load[$AP_j$])$\delta$[$AP_i,AP_j$]RSSI[$AP_i,AP_j$], where $\delta$[$AP_i$, $AP_j$] indicates whether there is channel overlapping between the $AP_i$ and the $AP_j$; and RSSI[$AP_i$, $AP_j$] indicates whether there is a neighbor relationship between the $AP_i$ and the $AP_j$, and i and j are used to identify different APs in the any branch.

In an example embodiment, the obtaining module is further configured to: obtain network usage of the plurality of APs in the currently allocated radio frequency resource; and compare and evaluate the network usage of the plurality of APs in the currently allocated radio frequency resource with network usage of the plurality of APs before the currently allocated radio frequency resource, and obtain a comparison evaluation indicator, where the comparison evaluation indicator is used to reflect a gain brought by the currently allocated radio frequency resource.

In an example embodiment, the apparatus further includes: an adjustment module, configured to optimize, based on the comparison evaluation indicator, a parameter used for allocating the radio frequency resource.

According to a third aspect, a radio frequency resource allocation system is provided. The system includes a plurality of access points APs and an analysis device.

The plurality of APs are configured to report radio frequency information of the plurality of APs, and the analysis device is configured to allocate a radio frequency resource to each of the plurality of APs according to the method in any one of the possible implementations of the first aspect.

According to a fourth aspect, this application provides a network device, configured to perform the method in any one of the first aspect and the possible implementations of the first aspect. Specifically, the network device includes a unit configured to perform the method in any one of the first aspect and the possible implementations of the first aspect.

According to a fifth aspect, this application provides a network device. The network device includes a processor, a network interface, and a memory. The network interface may be a transceiver. The memory may be configured to store program code, and the processor is configured to invoke the program code in the memory, to perform the method in any one of the first aspect and the possible implementations of the first aspect. Details are not described herein again.

According to a sixth aspect, this application provides a computer-readable storage medium, where the computer-readable storage medium stores an instruction, and when the instruction is run on a computer, the computer is enabled to perform the method in any one of the first aspect and the possible implementations of the first aspect.

According to a seventh aspect, this application provides a computer program product including a computer program instruction. When the computer program product runs on a network device, the network device is enabled to perform the method in any one of the first aspect and the possible implementations of the first aspect.

According to an eighth aspect, this application provides a chip, including a memory and a processor. The memory is configured to store a computer program, and the processor is configured to invoke the computer program from the memory and run the computer program, to perform the method in any one of the first aspect and the possible implementations of the first aspect.

Optionally, the chip includes only a processor. The processor is configured to read and execute a computer program stored in a memory. When the computer program is executed, the processor performs the method in any one of the first aspect or the possible implementations of the first aspect.

BRIEF DESCRIPTION OF DRAWINGS

To describe the technical solutions in embodiments of this application or in the background more clearly, the following briefly describes the accompanying drawings for describing the embodiments of this application or the background.

DESCRIPTION OF EMBODIMENTS

The following describes the embodiments of this application with reference to the accompanying drawings in the embodiments of this application.

An embodiment of this application provides a radio frequency resource allocation method. In the method, a radio frequency resource such as a channel and a frequency bandwidth is allocated based on load prediction. Actual interference comes from an RSSI and user service usage (hereinafter referred to as load). Therefore, in this application, an indicator is first established to describe the user load, and future load usage of each AP is predicted based on historical information. Then, the radio frequency resource such as the frequency bandwidth and the channel is allocated based on the predicted load of each AP. An allocation process is to optimize the actual interference. An optimization objective is obtained based on both the RSSI and the load. A final allocation result is on-demand allocation. A high-frequency bandwidth and a clean channel can be preferentially allocated to a heavy-load AP (the clean channel indicates that a neighboring AP of the heavy-load AP does not share a channel with the heavy-load AP or only a few light-load APs share a channel with the heavy-load AP). A low-frequency bandwidth is allocated to the light-load AP, and a channel may be congested (congestion indicates that the light-load AP needs to share the channel with another AP). Therefore, the actual interference on an entire network greatly decreases, and a user rate accordingly increases.

Figure 1:
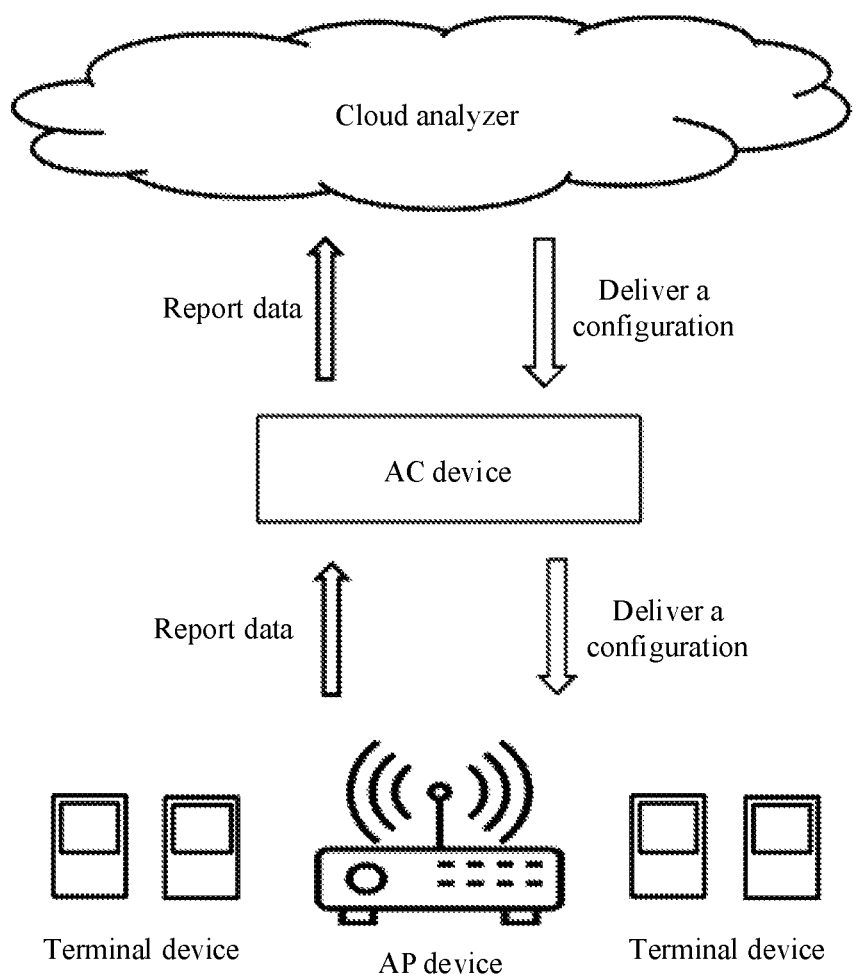
FIG. 1 is a schematic diagram of an application scenario according to an embodiment of this application.

An application scenario of a technical solution provided in this embodiment of this application is shown in FIG. 1. The scenario includes a terminal device, an AP device, a controller (access controller, AC) device, and a cloud analyzer (network cloud engineer). The AP device and the AC device are devices accessed through a WLAN. The cloud analyzer is a system that analyzes and controls a network system. The AP device provides a wireless access point, and the terminal device accesses the AP through the WLAN. The AP device collects all data generated in a user usage process, such as radio frequency information of the AP (such as a quantity of users, channel utilization, and traffic), and reports the data to a cloud. The reported data can be forwarded by the AC or the reported data cannot be forwarded by the AC. The cloud analyzer periodically processes the reported data, predicts, based on historical usage of each AP, load of each AP in a future period (for example, a target duration after a current moment), and allocates a corresponding radio frequency resource such as a frequency bandwidth and a channel to each AP based on the load and the frequency bandwidth and a channel allocation algorithm. Then, the cloud delivers an allocation result to the AC, and the AC delivers the bandwidth and the channel to each AP. Then, the AP continues to report all data obtained in a user usage process on a new frequency bandwidth and a new channel. The cloud analyzer compares and analyzes an allocation effect of the current channel and the current frequency bandwidth, and calculates an experience indicator of a network and a user, in other words, a comparison evaluation indicator, such as interference, a link rate, a latency, and packet loss. The comparison evaluation indicator is used to present, to the user, a gain brought by a channel and frequency bandwidth allocation algorithm. In addition, a comparison result, namely, the comparison evaluation indicator, is also used for optimizing a hyperparameter, for example, a quantity of high-frequency bandwidth APs. For example, if it is found that the interference of the network greatly increases, the quantity of high-frequency bandwidth APs is correspondingly reduced based on interference deterioration.

Figure 2:
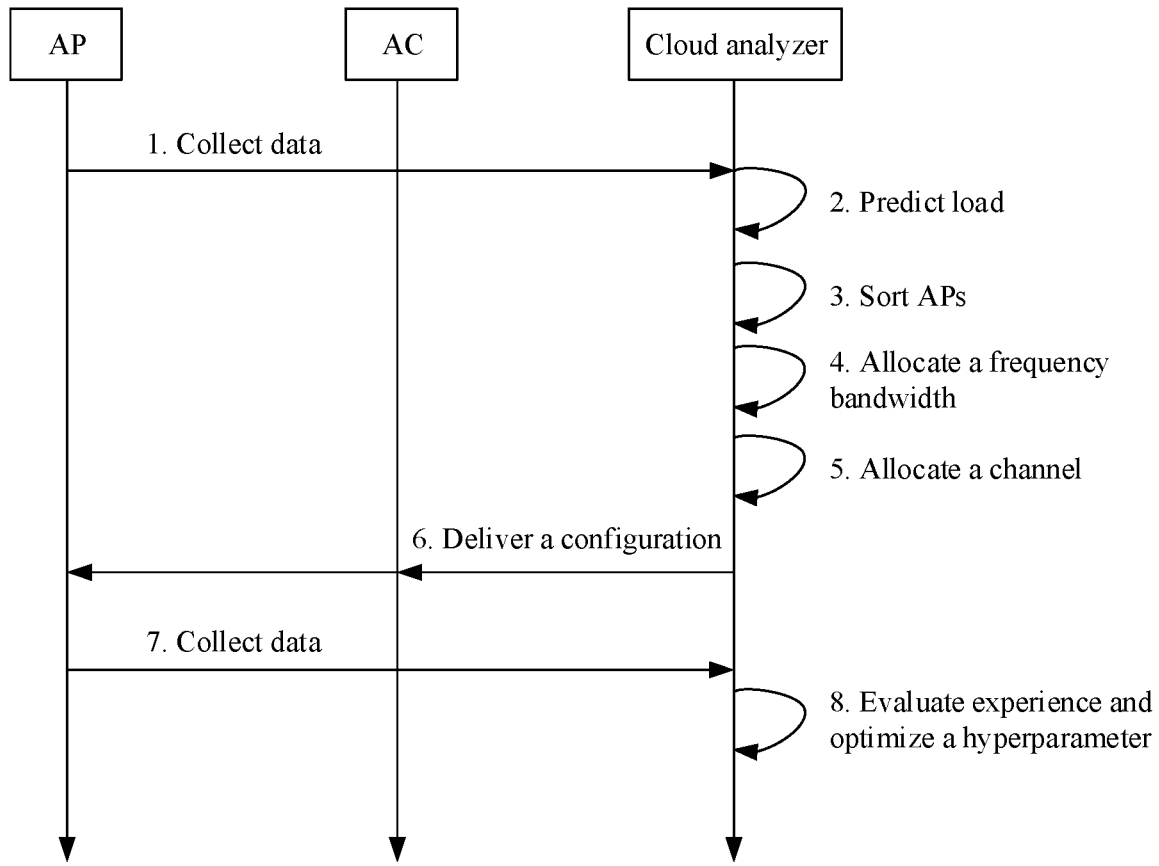
FIG. 2 is a schematic interaction diagram of a radio frequency resource allocation method according to an embodiment of this application.

As shown in FIG. 2, based on the application scenario shown in FIG. 1, an interaction process of a radio frequency resource allocation method provided in this embodiment of this application may include the following eight steps: 1. Collect data: obtain radio frequency information of each AP, for example, the radio frequency information includes RSSI information between an AP and a neighboring AP, and user usage data, where the user usage data includes but is not limited to information such as historical data traffic, channel utilization, and an interference rate. 2. Predict load: predict load in a future time period (that is, in a target duration after a current moment) based on a historical usage status of each AP. 3. Sort APs based on the predicted load: rank atop an AP with high load. 4. Allocate a frequency bandwidth: allocate a frequency bandwidth to each AP, for example, the frequency bandwidth is calculated based on the load of each AP. 5. Allocate a channel: based on an AP sequence and the allocated frequency bandwidth, optimize possible combinations of all APs, and select a branch of a minimum branch actual interference sum, to obtain a channel status of each AP. 6. Deliver a configuration to an AC, and the AC delivers the configuration to each AP. 7. Each AP continues to report usage data in a radio frequency resource such as the newly allocated frequency bandwidth and channel, then the AP continues to report new user usage data to a cloud, and the step 7 is the same as the step 1. 8. The cloud calculates a network and user experience indicator, such as interference, a rate, a latency, and packet loss, and optimizes a parameter based on the indicators, such as a quantity of high-frequency bandwidth APs.

Next, with reference to the process shown in FIG. 2, each of the foregoing steps is described in detail as follows:

1. Collect data: Data collection is used to collect radio frequency (RF) information of each AP. For example, the radio frequency information of the AP includes user usage data and RSSI information between the AP and each neighboring AP of the AP, where the user usage data includes but is not limited to data traffic of the AP in a data collection period; or the user usage data includes data traffic, channel utilization, and an interference rate of the AP in a data collection period; or the user usage data includes channel utilization and an interference rate of the AP in a data collection period; or the user usage data includes data traffic and channel utilization of the AP in a data collection period; or the user usage data includes data traffic and an interference rate of the AP in a data collection period. Specific content of the radio frequency information is not limited in this embodiment of this application, and specific content of the user usage data is not limited. In an example embodiment, the AP may measure data based on the data collection period, and report measured radio frequency information to a cloud analyzer through an AC, or the AP directly reports measured radio frequency information to a cloud analyzer.

For example, the radio frequency information reported by each AP based on the data collection period (for example, 10s) includes raw data such as data traffic, channel utilization, and an interference rate. For example, a plurality of APs in a network include an $AP_1$, an $AP_2$, and an $AP_3$. A data format of the RSSI information may be shown in Table 2.1 below.

TABLE 2.1

| RSSI information of APs | | | |
| --- | --- | --- | --- |
| AP name | $AP_1$ | $AP_2$ | $AP_3$ |
| $AP_1$ |  | −55 |  |
| $AP_2$ | −55 |  | −60 |
| $AP_3$ |  | −60 |  |

It can be learned from Table 2.1 that the $AP_2$ is a neighbor of the $AP_1$, and an RSSI between the $AP_1$ and the $AP_2$ is −55. The $AP_3$ is a neighbor of the $AP_2$, and an RSSI between the $AP_2$ and the $AP_3$ is −60. In addition, user usage data of the $AP_1$, the $AP_2$, and the $AP_3$ is shown in Table 2.2 below.

| User usage data of APs in Table 2.2 | | | |
| --- | --- | --- | --- |
| AP name | Timestamp | Traffic rate (Speed) | Interference rate |
| $AP_1$ | 2019-08-01 00:00:00 | 1.5 | 5 |
| $AP_2$ | 2019-08-01 00:00:10 | 6.2 | 8 |
| $AP_3$ | 2019-08-01 01:00:00 | 4.3 | 13 |

2. Predict load: Load prediction is used to analyze a usage rule of each AP based on historical load of each AP (for example, data in several weeks or several months), and predict load of each AP in a future time period (for example, in a target duration after a current moment). This process is executed by the cloud analyzer. In the specific time period (that is, in the target duration after the current moment), the cloud analyzer predicts the load of each AP based on obtained raw data, for example, the information about the traffic in the data collection period. The current moment is a moment of the load prediction. For example, if the target duration is 10 minutes, and the current moment is 10:00:00, the load of the AP in the period from 10:00:00 to 10:10:00 is predicted. Specifically, the load may be periodically predicted. Predicted period duration is not limited in this embodiment of this application. For example, if the load is predicted every 10 minutes, the load in each period is predicted at a start moment of the period. The start moment of the period is the current moment, and the period duration is the target duration.

In an example embodiment, in this embodiment of this application, a first historical load indicator count and a second historical load indicator load are used to describe load. For example, that load of any AP in target duration after a current moment is predicted based on radio frequency information of the any AP includes: determining a historical load indicator of the any AP based on the radio frequency information of the any AP, where the historical load indicator includes one or a combination of the first historical load indicator and the second historical load indicator; and predicting, based on the historical load indicator of the any AP, a predicted load indicator of the any AP in the target duration after the current moment, where the predicted load indicator includes one or a combination of a first predicted load indicator and a second predicted load indicator.

The first historical load indicator of the any AP is used to indicate a quantity of traffic rates of the any AP that are in a data collection period and that exceed a reference threshold. The second historical load indicator is used to indicate an average traffic rate of the any AP in the data collection period. The first historical load indicator and the second historical load indicator are used to describe historical load of the any AP. The first predicted load indicator and the second predicted load indicator are used to describe predicted load of the any AP. The target duration is not limited in this embodiment of this application, and may be set based on experience or an application scenario, or may be appropriately adjusted based on an allocation status.

For example, the determining a historical load indicator of the any AP based on the radio frequency information of the any AP includes: when the historical load indicator of the any AP includes the first historical load indicator, determining the first historical load indicator count of the any AP based on the radio frequency information of the any AP and the following formula:

$$Count = \Sigma I(speed > threshold).$$

The speed is the traffic rate of the AP. The threshold is the reference threshold, and may be a fixed threshold. If the threshold is exceeded, it indicates that the AP is heavily used. When the speed>the threshold, a value of I is a first value, and when the speed≤the threshold, the value of I is a second value. If the first value is greater than the second value, a larger count indicates larger load; or if the first value is less than the second value, a larger count indicates smaller load. For example, the first value may be 1, and the second value may be 0. For example, if there are six traffic rates in the data collection period, and three of the six traffic rates exceed the reference threshold, a value of the count is 3.

The value of count is used to indicate the quantity of traffic rates that are in the data collection period and that exceed the reference threshold. Each AP uses a same criterion to calculate the value of the count, and the value of count reflects the load of each AP. For example, when the value of the count is determined based on the quantity of traffic rates that exceed the reference threshold, the first value is 1, the second value is 0, and a larger value of the count of the AP indicates heavier load of the AP. In addition, when the value of count is determined based on the quantity of traffic rates that exceed the reference threshold, in addition to the first value being 1 and the second value being 0, the first value and the second value may be other values. For example, the first value is 2, and the second value is 0. Each time a traffic rate exceeds the reference threshold, the value of count of the AP is increased by 2, and the value of count can still indicate the quantity of traffic rates that are in the data collection period and that exceed the reference threshold.

In an example embodiment, in addition to determining the value of count based on the quantity of traffic rates that exceed the reference threshold, the value of count may also be determined based on a quantity of traffic rates that do not exceed the reference threshold. In this case, the first value is 0, and the second value is 1. A smaller value of the count of the AP indicates heavier load of the AP. The value of count can also reflect the load of the AP.

It should be noted that, when the user usage data in the radio frequency information includes the traffic rate, the first historical load indicator count may be directly calculated based on the traffic rate in the user usage data. When the user usage data in the radio frequency information does not include the traffic rate, but includes the channel utilization and the interference rate, the traffic rate can be calculated based on the channel utilization and the interference rate. For example, the speed=(the channel utilization−the interference rate)/the period. In addition, a value of threshold can be adjusted according to a method of obtaining the speed.

For the any AP in the plurality of APs, when the historical load indicator of the any AP includes the second historical load indicator, the second historical load indicator load of the any AP is determined based on the radio frequency information of the any AP and the following formula:

$$Load = \frac{1}{m} \sum speed_n,$$

where m represents a total quantity of data in a current time period, namely, the data collection period, and n is a positive integer greater than 1 and less than m.

After the historical load indicator is determined, historical data is first processed, to obtain statistical values of the two indicators. A statistical period can be specified, for example, 30 minutes. In this case, an example in which the historical load indicator includes the first historical load indicator and the second historical load indicator is used. A historical data format of each AP may be shown in Table 2.3.

TABLE 2.3

| Historical load information of each AP | | | |
|---|---|---|---|
| AP name | Timestamp | Count | Load |
| $AP_1$ | 2019-08-01 00:00:00 | 15 | 5 Mbit/s (Mbps) |
| $AP_2$ | 2019-08-01 00:30:00 | 20 | 10 Mbps |
| $AP_3$ | 2019-08-01 01:00:00 | 10 | 8 Mbps |

After the historical data of each AP is processed, the load of each AP is predicted. A rule, for example, a trend, a period, and volatility of the historical data of each AP is analyzed according to a prediction algorithm. For example, the prediction algorithm may include algorithms such as a gradient boosting decision tree (GBDT) algorithm and a long short-term memory (LSTM) algorithm. A data feature and a hyperparameter of the algorithm need to be adjusted based on a specific AP. Finally, load information of each AP in the future time period (that is, the target duration after the current moment) is obtained.

It should be noted that the historical load indicator may include only the first historical load indicator, or the historical load indicator may include only the second historical load indicator, or the historical load indicator includes the first historical load indicator and the second historical load indicator. When the historical load indicator includes the first historical load indicator and the second historical load indicator, the first historical load indicator may be determined in the forgoing manner of determining the first historical load indicator, and the second historical load indicator may be determined in the forgoing manner of determining the second historical load indicator.

In addition, because the historical load indicator of the any AP includes one or a combination of the first historical load indicator and the second historical load indicator, when the predicted load indicator of the any AP in the target duration after the current moment is predicted based on the historical load indicator of the any AP, if the historical load indicator of the any AP includes only the first historical load indicator, the first predicted load indicator of the any AP is predicted based on the first historical load indicator of the any AP. If the historical load indicator of the any AP includes only the second historical load indicator, the second predicted load indicator of the any AP is predicted based on the second historical load indicator of the any AP. If the historical load indicator of the any AP includes the first historical load indicator and the second historical load indicator, the first predicted load indicator of the any AP is predicted based on the first historical load indicator of the any AP, and the second predicted load indicator of the any AP is predicted based on the second historical load indicator of the any AP.

For example, the historical load indicator of each AP includes the first historical load indicator and the second historical load indicator. Predicted load of each AP is shown in Table 2.4 below.

TABLE 2.4

| Predicted load of each AP in the future period | | |
| --- | --- | --- |
| AP name | Count | Load |
| $AP_1$ | 5 | 5 Mbps |
| $AP_2$ | 12 | 10 Mbps |
| $AP_3$ | 15 | 8 Mbps |

3. Sort APs: APs are sorted based on the predicted load in the forgoing step, and a high-load AP is ranked atop. For example, if the predicted load indicator includes only the first predicted load indicator, the plurality of APs are sorted based on the first predicted load indicator. If the predicted load indicator includes only the second predicted load indicator, the plurality of APs are sorted based on the second predicted load indicator. If the predicted load indicator includes the first predicted load indicator and the second predicted load indicator, the plurality of APs are graded and sorted based on the first predicted load indicators of the plurality of APs, and APs at a same level are sorted based on the second predicted load indicator, to obtain a sorting result of the plurality of APs. For example, a sorting rule is that: Counts are first graded and then APs are sorted based on levels, a high-level AP is ranked atop, APs are sorted by load when they have the same level, and a high-load AP is ranked atop. A grading criterion is not limited in this embodiment of this application, and may be set based on experience or an application scenario. For example, 0 to 10 are currently graded as one level and 10 to 20 are graded as another level, a result obtained by sorting by count is the $AP_3$, the $AP_2$, and the $AP_1$. The $AP_3$ and the $AP_2$ are at the same level based on the level of 0 to 10 and the another level of 10 to 20. The $AP_3$ and the $AP_2$ are sorted by load, and the $AP_2$ is ranked before the $AP_3$. Therefore, the sorting result is shown in Table 2.5 below.

TABLE 2.5

| Sorted APs | | |
| --- | --- | --- |
| AP name | Count | Load |
| $AP_2$ | 12 | 10 Mbps |
| $AP_3$ | 15 | 8 Mbps |
| $AP_1$ | 5 | 5 Mbps |

It should be noted that, in addition to sorting the APs in a manner in which a high-level AP is ranked before a low-level AP, the APs may be sorted in a manner in which the low-level AP is ranked before the high-level AP. A sorting manner is not limited in this embodiment of this application. In the manner in which the low-level AP is ranked before the high-level AP, radio frequency resources can be allocated from back to front, to be specific, the radio frequency resources can be allocated in a manner in which the high-level AP is allocated before the low-level AP.

4. Allocate a frequency bandwidth: A radio frequency resource is allocated to each of the plurality of APs based on the sorting result of the APs. In an example embodiment, the radio frequency resource includes a frequency bandwidth, and that allocating the radio frequency resource to each of the plurality of APs based on the sorting result of the APs includes: determining a quantity of allocable target frequency bandwidths based on one or more of a quantity of the plurality of APs, available channel data, and a deployment environment; and allocating a frequency bandwidth resource to each of the plurality of APs based on the quantity of target frequency bandwidths and the sorting result of the plurality of APs.

For example, if the allocable target frequency bandwidths are 40 MHz and 20 MHz. A quantity of 40 MHz APs and a quantity of 20 MHz APs are separately determined based on a quantity of current APs, available channel data, whether a deployment environment is a high-density deployment, and the like, and then the frequency bandwidth is sequentially allocated to each of the APs. Whether the deployment environment is a high-density deployment may be determined by a quantity of APs per unit area. For example, if the quantity of APs per unit area exceeds a quantity threshold, the deployment environment is a high-density deployment. If the quantity of APs per unit area does not exceed the quantity threshold, the deployment environment is not a high-density deployment.

For example, in the sorting manner in which the high-level AP is ranked before the low-level AP, a high frequency bandwidth is allocated to an AP ranked atop, and a low frequency bandwidth is allocated to an AP ranked behind. In the sorting manner in which the low-level AP is ranked before the high-level AP, the low frequency bandwidth is allocated to the AP ranked atop, and the high frequency bandwidth is allocated to the AP ranked behind. For example, if the quantity of APs using the 40 MHz frequency bandwidth is 1 and the quantity of APs using the 20 MHz frequency bandwidth is 2, based on the sorting result shown in Table 2. 5, the frequency bandwidth allocation result is shown in Table 2.6.

TABLE 2.6

| Frequency bandwidth allocation of each AP | | | |
| --- | --- | --- | --- |
| AP name | Count | Load | Bandwidth |
| $AP_2$ | 12 | 10 Mbps | 40 Mhz |
| $AP_3$ | 15 | 8 Mbps | 20 Mhz |
| $AP_1$ | 5 | 5 Mbps | 20 Mhz |

5. Allocate a channel: Channel allocation is to allocate a channel based on the forgoing steps, including an RSSI information of a neighboring AP, the load prediction, and frequency bandwidth sorting and allocation. In an example embodiment, the radio frequency resource is allocated to each of the plurality of APs based on the sorting result of the plurality of APs. Channels are allocated based on an AP sequence. A quantity of channels needs to match that of the frequency bandwidths.

Figure 3:
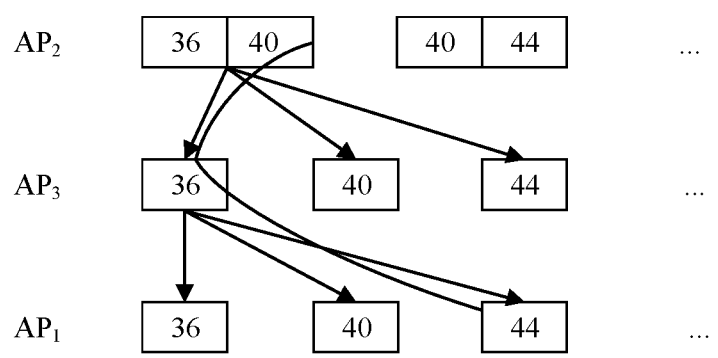
FIG. 3 is a schematic structural diagram of a branch obtained by combining APs according to an embodiment of this application.

For example, an initial channel is allocated to each of the plurality of APs based on the sorting result of the plurality of APs. An interference sum of each branch is calculated based on the initial channels allocated to the plurality of APs, where each branch is obtained through combination based on the initial channels allocated to the plurality of APs. A minimum interference sum is selected from the interference sums obtained through calculation. An initial channel corresponding to a branch of the minimum interference sum is used as a channel allocation result of the plurality of APs. One or more initial channels may be allocated to each AP based on the frequency bandwidths. For example, FIG. 3 is used as an example. Two initial channels are allocated to the $AP_2$ based on the frequency bandwidth, and the two initial channels may be a channel 36 and a channel 40, a channel 40 and a channel 44, and the like. One initial channel is allocated to the $AP_3$ based on the frequency bandwidth, and the initial channel may be a channel 36, a channel 40, and a channel 44. One initial channel is allocated to the $AP_1$ based on the frequency bandwidth, and the initial channel may be the channel 36, the channel 40, and the channel 44. Then, combination is performed based on the initial channel allocated to each AP, and each combination corresponds to one branch. For example, a branch that is not indicated by a solid line with an arrow in FIG. 3 is obtained after combination based on the initial channels of the channel 36 and the channel 40 that are allocated to the $AP_2$, and the initial channel of the channel 36 allocated to the $AP_3$ and the initial channel of the channel 44 allocated to the $AP_1$. Then, a minimum actual interference sum in a combination is found according to a combination optimization algorithm. A channel corresponding to the combination is a channel used by each AP. Detailed logic of the combined optimization algorithm is as follows:

For any branch, an interference sum of the any branch is calculated based on the initial channels allocated to the plurality of APs and the following formula. The following indicator is calculated for each branch:

Interference sum of the any branch=$\Sigma_{i,j}$(load[$AP_i$]+ load[$AP_j$])$\delta$[$AP_i,AP_j$]RSSI[$AP_i,AP_j$], where $\delta$[$AP_i$, $AP_j$] indicates whether there is channel overlapping between the $AP_i$ and the $AP_j$; and RSSI[$AP_i$, $AP_j$] indicates whether there is a neighbor relationship between the $AP_i$ and the $AP_j$, and i and j are used to identify different APs in the any branch.

With reference to Table 2.6, using the branch that is not indicated by the solid line with the arrow in FIG. 3 as an example, 36, 40, and 44 in FIG. 3 respectively represent different channels. For the branch that is indicated by the solid line with the arrow, an interference sum of the branch is calculated as follows:

$$(\text{load}[AP_2] + \text{load}[AP_3])\delta[AP_2, AP_3]RSSI[AP_2, AP_3] +$$
$$(\text{load}[AP_2] + \text{load}[AP_1])\delta[AP_2, AP_1]RSSI[AP_2, AP_1] +$$
$$(\text{load}[AP_3] + \text{load}[AP_1])\delta[AP_3, AP_1]RSSI[AP_3, AP_1] =$$
$$(10+8) \times 1 \times 1 + (10+5) \times 0 \times 1 + (8+5) \times 0 \times 0 = 18.$$

The load of the $AP_2$ is 10, the load of the $AP_3$ is 8, and the load of the $AP_1$ is 5. It can be seen from FIG. 3 that the channels of the $AP_2$ are 36 and 40, the channel of the $AP_3$ is 36, there is channel overlapping between the channels of the $AP_2$ and the $AP_3$, for example, the channel 36, and the $AP_2$ and the $AP_3$ have a neighbor relationship. Therefore, load [$AP_2$]+load[$AP_3$]=10+8, $\delta$[$AP_2$, $AP_3$]=1, RSSI[$AP_2$, $AP_3$]=1. It can be seen from FIG. 3 that the channels of the $AP_2$ are 36 and 40, the channel of the $AP_1$ is 44, there is no channel overlapping between the $AP_3$ and the $AP_1$, and there is a neighbor relationship between the $AP_2$ and the $AP_1$. Therefore, load[$AP_2$]+load [$AP_1$]=10+5, $\delta$[$AP_2$, $AP_1$]=0, and RSSI[$AP_2$, $AP_1$]=1. It can be seen from FIG. 3 that the channel of the $AP_3$ is 36, the channel of the $AP_1$ is 44, there is no channel overlapping between the $AP_3$ and the $AP_1$, and there is no neighbor relationship between the $AP_1$ and the $AP_3$. Therefore, load[$AP_3$]+load[$AP_1$]=8+5, $\delta$[$AP_3$,$AP_1$]=0, and RSSI[$AP_3$, $AP_1$]=0.

Based on the foregoing manner of calculating the interference sum of the branch shown in FIG. 3, the foregoing calculation is performed on each branch, and the channel corresponding to the branch having the minimum interference sum is finally selected as the channel allocation result. For example, in the branch having the minimum interference sum, the channel 36 is allocated to the $AP_2$, the channel 44 is allocated to the $AP_3$, and a channel 52 is allocated to $AP_1$ (not shown in FIG. 3).

It should be noted that third-party interference also needs to be considered for channel allocation. If a third-party interference source is detected in a network and interference of the third-party interference source is severe, the third-party interference source needs to be avoided. In this case, a channel used by the third-party interference source is not used for channel allocation. In other words, a cloud analyzer detects whether there is the third-party interference source. If there is the third-party interference source, the cloud analyzer determines a channel used by the third-party interference source. The channel used by the third-party interference source is not allocated when a channel is allocated to an AP, to reduce interference caused by the third-party interference source to the AP.

6. Delivery a configuration: After obtaining the radio frequency resource such as the channel and the frequency bandwidth of each AP, the cloud analyzer delivers the allocation result to the AC, and the AC delivers the allocation result to each AP. For example, a delivered data format may be shown in the following Table 2.7.

TABLE 2.7

| Channel and frequency bandwidth configuration of APs | | |
|---|---|---|
| AP name | Channel | Bandwidth |
| $AP_2$ | 36 | 40 Mhz |
| $AP_3$ | 44 | 20 Mhz |
| $AP_1$ | 52 | 20 Mhz |

7. Collect data: The step is the same as the step 1. A newly allocated radio frequency resource is used for data collection.

8. Evaluate experience and optimize a hyperparameter: After collecting network usage of a user on a new channel and a frequency bandwidth, the cloud analyzer compares and evaluates the network and user experience. A comparison evaluation indicator includes interference, a link rate, a latency, and packet loss, and the like, the comparison evaluation indicator is used to directly reflect a gain brought by the channel allocation and the frequency bandwidth allocation. For example, the evaluation indicator and the gain are shown in the following Table 2.8.

TABLE 2.8

| | Comparison evaluation | | | |
|---|---|---|---|---|
| | Interference | Link rate | Latency | Packet loss |
| Previous period | 12 | 120 | 75 | 20 |
| Current period | 10 | 150 | 45 | 5 |
| Gain (%) | −16% | 25% | −40% | −75% |

Gain=(current period−previous period)/previous period× 100. Using the link rate as an example, if a link rate in the current period is 150 and a link rate in the previous period is 120, a gain of the link rate is 25% ((150−120)/120×100).

In addition, a comparison result is also used for hyperparameter optimization. For example, a parameter used for radio frequency resource allocation is optimized based on the comparison evaluation indicator, for example, a quantity of high-frequency bandwidth APs, and a reference threshold used for calculating a count. For example, if it is found that interference of the network increases greatly, the quantity of high-frequency bandwidth APs is correspondingly reduced based on an interference deterioration status. Therefore, after the comparison evaluation indicator is obtained based on the currently allocated radio frequency resource, the parameter used for allocating the radio frequency resource is optimized based on the comparison evaluation indicator, so that when the radio frequency resource is subsequently allocated, allocation is performed based on the optimized parameter, to further reduce interference.

Figure 4:
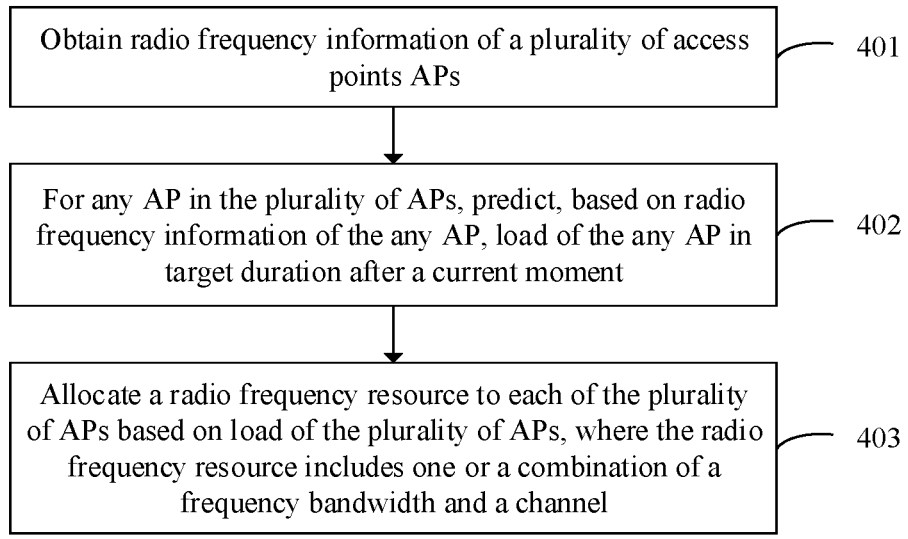
FIG. 4 is a schematic flowchart of a radio frequency resource allocation method according to an embodiment of this application.

With reference to the radio frequency resource allocation process shown in FIG. 2, a network device, for example, the cloud analyzer, is used as an example to describe in detail a radio frequency resource allocation method. Referring to FIG. 4, the method includes the following process.

401: Obtain radio frequency information of a plurality of access points APs.

In an example embodiment, radio frequency information of any AP in the plurality of APs includes received signal strength indicator RSSI information between the any AP and each neighboring AP, and user usage data of the any AP.

For example, the user usage data of the any AP includes data traffic of the any AP in a data collection period.

For example, the user usage data of the any AP includes channel utilization and an interference rate of the any AP in a data collection period. Alternatively, the user usage data of the any AP includes data traffic, channel utilization, and an interference rate of the any AP in a data collection period.

402: For the any AP in the plurality of APs, predict, based on the radio frequency information of the any AP, load of the any AP in target duration after a current moment.

In an example embodiment, the predicting, based on the radio frequency information of the any AP, the load of the any AP in the target duration after the current moment includes: determining a historical load indicator of the any AP based on the radio frequency information of the any AP, where the historical load indicator includes one or a combination of a first historical load indicator and a second historical load indicator, the first historical load indicator of the any AP is used to indicate a quantity of traffic rates of the any AP that are in the data collection period and that exceed a reference threshold, the second historical load indicator is used to indicate an average traffic rate of the any AP in the data collection period, and the first historical load indicator and the second historical load indicator are used to describe historical load of the any AP; and predicting, based on the historical load indicator of the any AP, a predicted load indicator of the any AP in the target duration after the current moment, where the predicted load indicator includes a first predicted load indicator and a second predicted load indicator, and the first predicted load indicator and the second predicted load indicator are used to describe predicted load of the any AP.

For example, that determine the first historical load indicator and the second historical load indicator of the any AP based on the radio frequency information of the any AP includes: when the historical load indicator of the any AP includes the first historical load indicator, determining the first historical load indicator count of the any AP based on the radio frequency information of the any AP and the following formula:

$$\text{Count} = \Sigma I(\text{speed} > \text{threshold}); \text{ and/or}$$

when the historical load indicator of the any AP includes the second historical load indicator, determining the second historical load indicator load of the any AP based on the radio frequency information of the any AP and the following formula:

$$\text{Load} = \frac{1}{m} \sum \text{speed}_n,$$

where the speed is the traffic rate of the any AP, the threshold is the reference threshold, m is a total quantity of data in the data collection period, n is a positive integer greater than 1 and less than m, when the speed>the threshold, a value of I is a first value, when the speed≤the threshold, the value of I is a second value, and if the first value is greater than the second value, a larger count indicates larger load, or if the first value is less than the second value, a larger count indicates smaller load.

For example, the first value is 1, and the second value is 0.

403: Allocate a radio frequency resource to each of the plurality of APs based on load of the plurality of APs, where the radio frequency resource includes one or a combination of a frequency bandwidth and a channel.

In an example embodiment, the allocating the radio frequency resource to each of the plurality of APs based on load of the plurality of APs includes: grading and sorting the plurality of APs based on the first predicted load indicators of the plurality of APs, and sorting APs at a same level based on the second predicted load indicator, to obtain a sorting result of the plurality of APs, and allocating the radio frequency resource to each of the plurality of APs based on the sorting result of the plurality of APs.

For example, the radio frequency resource includes the frequency bandwidth, and the allocating the radio frequency resource to each of the plurality of APs based on the sorting result of the plurality of APs includes: determining a quantity of allocable target frequency bandwidths based on one or more of a quantity of the plurality of APs, available channel data, and a deployment environment, and allocating a frequency bandwidth resource to each of the plurality of APs based on the quantity of target frequency bandwidths and the sorting result of the plurality of APs.

For example, the radio frequency resource includes the channel, and the allocating the radio frequency resource to each of the plurality of APs based on the sorting result of the plurality of APs includes: allocating an initial channel to each of the plurality of APs based on the sorting result of the plurality of APs; calculating an interference sum of each branch based on the initial channels allocated to the plurality of APs, where each branch is obtained through combination based on the initial channel allocated to the plurality of APs; and selecting a minimum interference sum from the interference sums obtained through calculation, and using an initial channel corresponding to a branch of the minimum interference sum as a channel allocation result of the plurality of APs.

For example, the calculating an interference sum of each branch based on the initial channels allocated to the plurality of APs includes: for any branch, calculating an interference sum of the any branch based on the initial channels allocated to the plurality of APs and the following formula:

Interference sum of the any branch=$\Sigma_{i,j}(\text{load}[AP_i]+\text{load}[AP_j])\delta[AP_i,AP_j]\text{RSSI}[AP_i,AP_j]$, where $\delta[AP_i, AP_j]$ indicates whether there is channel overlapping between the $AP_i$ and the $AP_j$; and RSSI $[AP_i, AP_j]$ indicates whether there is a neighbor relationship between the $AP_i$ and the $AP_j$. i and j are used to identify different APs in the any branch.

In an example embodiment, after the allocating a radio frequency resource to each of the plurality of APs based on load of the plurality of APs, the method further includes: obtaining network usage of the plurality of APs in the currently allocated radio frequency resource; and comparing and evaluating the network usage of the plurality of APs in the currently allocated radio frequency resource with network usage of the plurality of APs before the currently allocated radio frequency resource, and obtaining a comparison evaluation indicator, where the comparison evaluation indicator is used to reflect a gain brought by the currently allocated radio frequency resource.

For example, after the obtaining a comparison evaluation indicator, the method further includes: optimizing, based on the comparison evaluation indicator, a parameter used for allocating the radio frequency resource.

It should be noted that, for an implementation of the steps in the embodiment shown in FIG. 4, refer to the description of the steps in FIG. 2. Details are not described herein again.

According to the method provided in this embodiment of this application, the load of the AP in the target duration after the current moment is predicted based on the radio frequency information of the AP, and the radio frequency resource such as the channel and the frequency bandwidth is allocated based on the predicted load, so that a clean channel is preferentially allocated to a heavy-load AP. This ensures that the heavy-load AP has a high frequency bandwidth, avoids sharing a frequency with another heavy-load AP, and greatly reduces interference.

Figure 5:
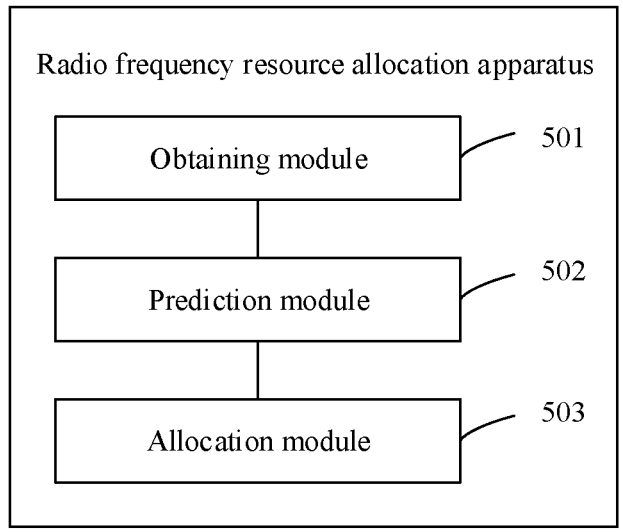
FIG. 5 is a schematic structural diagram of a radio frequency resource allocation apparatus according to an embodiment of this application.

An embodiment of this application provides a radio frequency resource allocation apparatus. Referring to FIG. 5, the apparatus includes:

an obtaining module 501, configured to obtain radio frequency information of a plurality of access points APs;

a prediction module 502, configured to: for any AP in the plurality of APs, predict, based on radio frequency information of the any AP, load of the any AP that is in target duration after a current moment; and an allocation module 503, configured to allocate a radio frequency resource to each of the plurality of APs based on load of the plurality of APs, where the radio frequency resource includes one or a combination of a frequency bandwidth and a channel.

In an example embodiment, the radio frequency information of the any AP in the plurality of APs includes received signal strength indicator RSSI information between the any AP and each neighboring AP, and user usage data of the any AP.

In an example embodiment, the user usage data of the any AP includes data traffic of the any AP in a data collection period.

In an example embodiment, the user usage data of the any AP includes channel utilization and an interference rate of the any AP in the data collection period.

In an example embodiment, the prediction module 502 is configured to: determine a historical load indicator of the any AP based on the radio frequency information of the any AP, where the historical load indicator includes one or a combination of a first historical load indicator and a second historical load indicator, the first historical load indicator of the any AP is used to indicate a quantity of traffic rates of the any AP that are in the data collection period and that exceed a reference threshold, the second historical load indicator is used to indicate an average traffic rate of the any AP in the data collection period, and the first historical load indicator and the second historical load indicator are used to describe historical load of the any AP; and predict, based on the historical load indicator of the any AP, a predicted load indicator of the any AP in the target duration after the current moment, where the predicted load indicator includes one or a combination of a first predicted load indicator and a second predicted load indicator, and the first predicted load indicator and the second predicted load indicator are used to describe predicted load of the any AP.

In an example embodiment, the prediction module 502 is configured to: determine the first historical load indicator count of the any AP based on the radio frequency information of the any AP and the following formula:

$$\text{Count} = \Sigma I(\text{speed} > \text{threshold}); \text{ and}$$

determine the second historical load indicator load of the any AP based on the radio frequency information of the any AP and the following formula:

$$\text{Load} = \frac{1}{m} \sum \text{speed}_n,$$

where the speed is the traffic rate of the any AP, the threshold is the reference threshold, m is a total quantity of data in the data collection period, n is a positive integer greater than 1 and less than m, when the speed>the threshold, a value of I is a first value, when the speed≤the threshold, the value of I is a second value, and if the first value is greater than the second value, a larger count indicates larger load, or if the first value is less than the second value, a larger count indicates smaller load.

For example, the first value is 1, and the second value is 0.

In an example embodiment, the allocation module 503 is configured to:

grade and sort the plurality of APs based on the first predicted load indicators of the plurality of APs, and sort APs at a same level based on the second predicted load indicator, to obtain a sorting result of the plurality of APs; and allocate the radio frequency resource to each of the plurality of APs based on the sorting result of the plurality of APs.

In an example embodiment, the radio frequency resource includes the frequency bandwidth, and the allocation module 503 is configured to: determine a quantity of allocable target frequency bandwidths based on one or more of a quantity of the plurality of APs, available channel data, and a deployment environment; and allocate a frequency bandwidth resource to plurality of APs based on the quantity of target frequency bandwidths and the sorting result of the plurality of APs.

In an example embodiment, the radio frequency resource includes the channel, and the allocation module 503 is configured to: allocate an initial channel to the plurality of APs based on the sorting result of the plurality of APs; calculate an interference sum of each branch based on the initial channels allocated to the plurality of APs, where each branch is obtained through combination based on the initial channels allocated to the plurality of APs; and select a minimum interference sum from the interference sums obtained through calculation, and use an initial channel corresponding to a branch of the minimum interference sum as a channel allocation result of the plurality of APs.

In an example embodiment, the allocation module 503 is configured to: for any branch, calculate an interference sum of the any branch based on the initial channels allocated to the plurality of APs and the following formula:

$$\text{Interference sum of the any branch} = \Sigma_{i,j}(\text{load}[AP_i] + \text{load}[AP_j])\delta[AP_i, AP_j]\text{RSSI}[AP_i, AP_j], \text{ where}$$

$\delta[AP_i, AP_j]$ indicates whether there is channel overlapping between the $AP_i$ and the $AP_j$; and $\text{RSSI}[AP_i, AP_j]$ indicates whether there is a neighbor relationship between the $AP_i$ and the $AP_j$, and i and j are used to identify different APs in the any branch.

In an example embodiment, the obtaining module 501 is further configured to: obtain network usage of the plurality of APs in the currently allocated radio frequency resource; and compare and evaluate the network usage of the plurality of APs in the currently allocated radio frequency resource with network usage of the plurality of APs before the currently allocated radio frequency resource, and obtain a comparison evaluation indicator, where the comparison evaluation indicator is used to reflect a gain brought by the currently allocated radio frequency resource.

Figure 6:
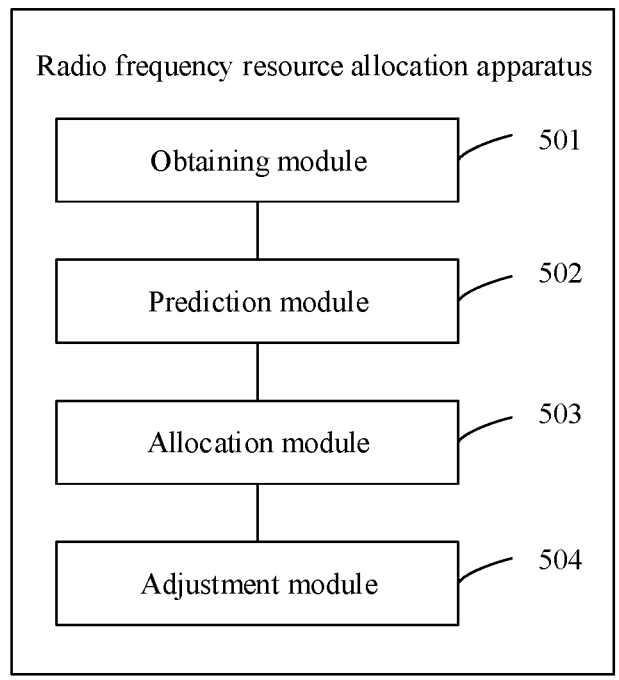
FIG. 6 is a schematic structural diagram of a radio frequency resource allocation apparatus according to an embodiment of this application.

In an example embodiment, referring to FIG. 6, the apparatus further includes:

an adjustment module 504, configured to optimize, based on the comparison evaluation indicator, a parameter used for allocating the radio frequency resource.

According to the apparatus provided in this embodiment of this application, the load of the AP that is in the target duration after the current moment is predicted based on the radio frequency information of the AP, and the radio frequency resource such as the channel and the frequency bandwidth is allocated based on the predicted load, so that a clean channel is preferentially allocated to a heavy-load AP. This ensures that the heavy-load AP has a high frequency bandwidth, avoids sharing a frequency with another heavy-load AP, and greatly reduces interference.

It should be understood that, when the apparatuses provided in FIG. 5 and FIG. 6 implement functions of the apparatuses, division of the foregoing functional modules is merely used as an example for description. In actual application, the foregoing functions may be allocated to different functional modules for implementation according to a requirement, in other words, an internal structure of a device is divided into different functional modules, to implement all or some of the functions described above. In addition, the apparatus provided in the foregoing embodiments and the method embodiments pertain to a same concept. For a specific implementation process thereof, refer to the method embodiments. Details are not described herein again.

Figure 7:
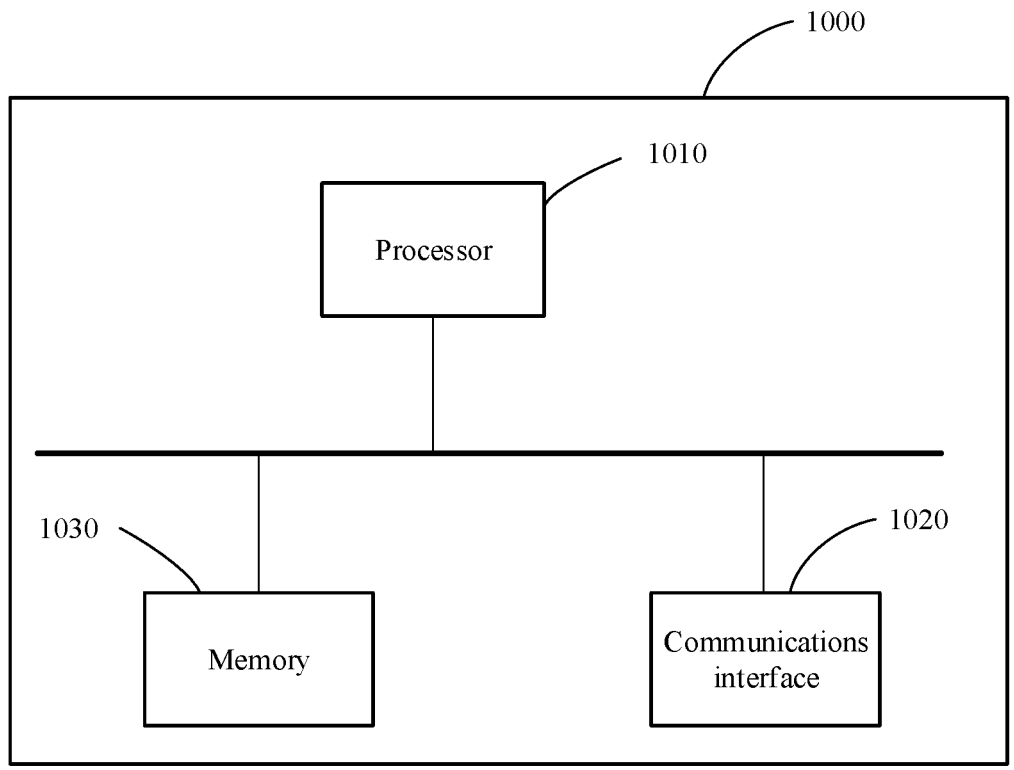
FIG. 7 is a schematic structural diagram of an analysis device according to an embodiment of this application.

This application further provides an analysis device 1000. The analysis device 1000 is configured to perform the foregoing method, and may be specifically the cloud analyzer shown in FIG. 1. As shown in FIG. 7, the analysis device 1000 includes a processor 1010 and a plurality of communications interfaces 1020.

The processor 1010 is configured to implement an operation performed by the cloud analyzer in the foregoing method embodiment of this application. When communicating with another device, the processor 1010 communicates with the another device by using the communications interface 1020. The processor 1010 may be specifically a central processing unit (CPU), an application-specific integrated circuit (ASIC), or one or more integrated circuits configured to implement this embodiment of this application.

As shown in FIG. 7, the analysis device 1000 may further include a memory 1030. The processor 1010 and the memory 1030 may communicate with each other by using a bus. The memory 1030 is configured to store a computer operation instruction, and may be specifically a high-speed random access memory (RAM), or may be a non-volatile memory. The processor 1010 may specifically execute the computer operation instruction stored in the memory 1030, and by executing the computer operation instruction, enable the analysis device 1000 to perform the operation performed by the cloud analyzer in the foregoing method.

A computer-readable storage medium is further provided. The storage medium stores at least one instruction, and the instruction is loaded and executed by the processor to implement any one of the foregoing radio frequency resource allocation methods.

This application provides a computer program. When the computer program is executed by a computer, the processor or the computer may be enabled to perform corresponding operations and/or procedures in the foregoing method embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state drive (SSD)), or the like.

The "first" mentioned in the embodiments of this application is merely used as a name identifier, and does not represent the first in sequence. The rule is also applicable to "second", "third", and the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A radio frequency resource allocation method, comprising:
obtaining radio frequency information of a plurality of access points (APs);
for each AP in the plurality of APs, predicting, based on radio frequency information of the AP, a load of the AP in a target duration after a current moment; and allocating a radio frequency resource to each of the plurality of APs based on the predicted loads of the plurality of APs during the target duration, wherein the radio frequency resource comprises one or a combination of a frequency bandwidth and a channel, wherein the predicting, based on radio frequency information of the AP, a load of the AP in a target duration after a current moment comprises:

determining a historical load indicator of the AP based on the radio frequency information of the AP, wherein the historical load indicator comprises one or a combination of a first historical load indicator and a second historical load indicator, the first historical load indicator of the AP is used to indicate a quantity of traffic rates of the AP that are in a data collection period and that exceed a reference threshold, the second historical load indicator is used to indicate an average traffic rate of the AP in the data collection period, and the first historical load indicator and the second historical load indicator are used to describe historical load of the AP; and predicting, based on the historical load indicator of the AP, a predicted load indicator of the AP in the target duration after the current moment, wherein the predicted load indicator comprises one or a combination of a first predicted load indicator and a second predicted load indicator, and the first predicted load indicator and the second predicted load indicator are used to describe the predicted load of the AP, wherein the determining a historical load indicator of the AP based on the radio frequency information of the AP comprises:

in response to the historical load indicator of the AP comprises the second historical load indicator, determining the second historical load indicator of the AP based on the radio frequency information of the AP and the following formula:

$$\text{Load} = \frac{1}{m}\sum speed_n,$$

wherein the speed is the traffic rate of the AP, m is a total quantity of data in the data collection period, n is a positive integer greater than 1 and less than m.

2. The method according to claim 1, wherein the radio frequency information of the AP comprises received signal strength indicator (RSSI) information between the AP and each neighboring AP, and user usage data of the AP.

3. The method according to claim 2, wherein the user usage data of the AP comprises data traffic of the AP in the data collection period.

4. The method according to claim 2, wherein the user usage data of the AP comprises channel utilization and an interference rate of the AP in the data collection period.

5. The method according to claim 1, wherein the allocating a radio frequency resource to each of the plurality of APs based on the predicted loads of the plurality of APs comprises:

grading and sorting the plurality of APs based on first predicted load indicators of the plurality of APs, and sorting APs at a same level based on second predicted load indicators, to obtain a sorting result of the plurality of APs; and allocating the radio frequency resource to each of the plurality of APs based on the sorting result of the plurality of APs.

6. The method according to claim 1, wherein after the allocating a radio frequency resource to each of the plurality of APs based on the predicated loads of the plurality of APs, the method further comprises:

obtaining network usage of the plurality of APs in the allocated radio frequency resource; and comparing and evaluating the network usage of the plurality of APs in the allocated radio frequency resource with network usage of the plurality of APs before the allocated radio frequency resource, and obtaining a comparison evaluation indicator, wherein the comparison evaluation indicator is used to reflect a gain brought by the allocated radio frequency resource.

7. The method according to claim 6, wherein after the obtaining a comparison evaluation indicator, the method further comprises:

optimizing, based on the comparison evaluation indicator, a parameter used for allocating the radio frequency resource.

8. A radio frequency resource allocation method, comprising:

obtaining radio frequency information of a plurality of access points (APs);

for each AP in the plurality of APs, predicting, based on radio frequency information of the AP, a load of the AP in a target duration after a current moment; and allocating a radio frequency resource to each of the plurality of APs based on the predicted loads of the plurality of APs during the target duration, wherein the radio frequency resource comprises one or a combination of a frequency bandwidth and a channel, wherein the predicting, based on radio frequency information of the AP, a load of the AP in a target duration after a current moment comprises:

determining a historical load indicator of the AP based on the radio frequency information of the AP, wherein the historical load indicator comprises one or a combination of a first historical load indicator and a second historical load indicator, the first historical load indicator of the AP is used to indicate a quantity of traffic rates of the AP that are in a data collection period and that exceed a reference threshold, the second historical load indicator used to indicate an average traffic rate of the AP in the data collection period, and the first historical load indicator and the second historical load indicator are used to describe historical load of the AP; and predicting, based on the historical load indicator of the AR, a predicted load indicator of the AP in the target duration after the current moment, wherein the predicted load indicator comprises one or a combination of a first predicted load indicator and a second predicted load indicator, and the first predicted load indicator and the second predicted load indicator are used to describe the predicted load of the AP, wherein the determining a historical load indicator of the AP based on the radio frequency information of the AP comprises:

in response to the historical load indicator of the AP comprises the first historical load indicator, determining a first historical load indicator count of the AP based on the radio frequency information of the AP and the following formula:

Count=Σ*I*(speed>threshold)

wherein, the speed is the traffic rate of the AP, the threshold is the reference threshold, in response to the speed is larger than the threshold, a value of I is a first value, in response to the speed is less than or equal to the threshold, the value of I is a second value, and if the first value is greater than the second value, a larger count indicates a larger load, or if the first value is less than the second value, a larger count indicates a smaller load.

9. The method according to claim 8, wherein the first value is 1, and the second value is 0.

10. A radio frequency resource allocation method, comprising:
obtaining radio frequency information of a plurality of access points (APs);
for each AP in the plurality of APs, predicting, based on radio frequency information of the AP, a load of the AP in a target duration after a current moment; and
allocating a radio frequency resource to each of the plurality of APs based on the predicted loads of the plurality of APs during the target duration, wherein the radio frequency resource comprises one or a combination of a frequency bandwidth and a channel,
wherein the predicting, based on radio frequency information of the AP, a load of the AP in a target duration after a current moment comprises:
determining a historical load indicator of the AP based on the radio frequency information of the AP, wherein the historical load indicator comprises one or a combination of a first historical load indicator and a second historical load indicator, the first historical load indicator of the AP is used to indicate a quantity of traffic rates of the AP that are in a data collection period and that exceed a reference threshold, the second historical load indicator is used to indicate an average traffic rate of the AP in the data collection period, and the first historical load indicator and the second historical load indicator are used to describe historical load of the AP; and
predicting, based on the historical load indicator of the AP, a predicted load indicator of the AP in the target duration after the current moment, wherein the predicted load indicator comprises one or a combination of a first predicted load indicator and a second predicted load indicator, and the first predicted load indicator and the second predicted load indicator are used to describe the predicted load of the AP,
wherein the determining a historical load indicator of the AP based on the radio frequency information of the AP comprises:
grading and sorting the plurality of APs based on first predicted load indicators of the plurality of APs, and sorting APs at a same level based on second predicted load indicators, to obtain a sorting result of the plurality of APs; and
allocating the radio frequency resource to each of the plurality of APs based on the sorting result of the plurality of APs,
wherein the radio frequency resource comprises the frequency bandwidth, and the allocating the radio frequency resource to each of the plurality of APs based on the sorting result of the plurality of APs comprises:
determining a quantity of allocable target frequency bandwidths based on one or more of a quantity of the plurality of APs, available channel data, and a deployment environment; and
allocating a frequency bandwidth resource to each of the plurality of APs based on the quantity of the target frequency bandwidths and the sorting result of the plurality of APs.

11. A radio frequency resource allocation method, comprising:
obtaining radio frequency information of a plurality of access points (APs);
for each AP in the plurality of APs, predicting, based on radio frequency information of the AP, a load of the AP in a target duration after a current moment; and
allocating a radio frequency resource to each of the plurality of APs based on the predicted loads of the plurality of APs during the target duration, wherein the radio frequency resource comprises one or a combination of a frequency bandwidth and a channel,
wherein the predicting, based on radio frequency information of the AP, a load of the AP in a target duration after a current moment comprises:
determining a historical load indicator of the AP based on the radio frequency information of the AP, wherein the historical load indicator comprises one or a combination of a first historical load indicator and a second historical load indicator, the first historical load indicator of the AP is used to indicate a quantity of traffic rates of the AP that are in a data collection period and that exceed a reference threshold, the second historical load indicator is used to indicate an average traffic rate of the AP in the data collection period, and the first historical load indicator and the second historical load indicator are used to describe historical load of the AP; and
predicting, based on the historical load indicator of the AP, a predicted load indicator of the AP in the target duration after the current moment, wherein the predicted load indicator comprises one or a combination of a first predicted load indicator and a second predicted load indicator, and the first predicted load indicator and the second predicted load indicator are used to describe the predicted load of the AP,
wherein the determining a historical load indicator of the AP based on the radio frequency information of the AP comprises:
grading and sorting the plurality of APs based on first predicted load indicators of the plurality of APs, and sorting APs at a same level based on second predicted load indicators, to obtain a sorting result of the plurality of APs; and
allocating the radio frequency resource to each of the plurality of APs based on the sorting result of the plurality of APs,
wherein the radio frequency resource comprises the channel, and the allocating the radio frequency resource to each of the plurality of APs based on the sorting result of the plurality of APs comprises:
allocating an initial channel to each of the plurality of APs based on the sorting result of the plurality of APs;
calculating an interference sum of each branch based on the initial channels allocated to the plurality of APs, wherein each branch is obtained through combination based on the initial channels allocated to the plurality of APs; and selecting a minimum interference sum from the interference sums obtained through calculation, and using an initial channel corresponding to a branch of the minimum interference sum as a channel allocation result of the plurality of APs.

12. The method according to claim 11, wherein the calculating an interference sum of each branch based on the initial channels allocated to the plurality of APs comprises:

for the branch, calculating an interference sum of the branch based on the initial channels allocated to the plurality of APs and the following formula:

Interference sum of the any branch=$\Sigma_{i,j}$(load[$AP_i$]+ load[$AP_j$])$\delta$[$AP_i$,$AP_j$]RSSI[$AP_i$,$AP_j$], wherein $\delta$ [$AP_i$, $AP_j$] indicates whether there is channel overlapping between the $AP_i$ and the $AP_j$; and RSSI[$AP_i$, $AP_j$] indicates whether there is a neighbor relationship between the $AP_i$ and the $AP_j$, and i and j are used to identify different APs in the branch.

13. A radio frequency resource allocation device, comprising:

a memory and a processor, wherein the memory stores at least one instruction that, when executed by the processor, causes the processor to implement:

obtaining radio frequency information of a plurality of access points (APs);

for each AP in the plurality of APs, predicting, based on radio frequency information of the AP, a load of the AP in a target duration after a current moment; and allocating a radio frequency resource to each of the plurality of APs based on the predicted loads of the plurality of APs during the target duration, wherein the radio frequency resource comprises one or a combination of a frequency bandwidth and a channel, wherein the predicting, based on radio frequency information of the AP, a load of the AP in a target duration after a current moment comprises:

determining a historical load indicator of the AP based on the radio frequency information of the AP, wherein the historical load indicator comprises one or a combination of a first historical load indicator and a second historical load indicator, the first historical load indicator of the AP is used to indicate a quantity of traffic rates of the AP that are in a data collection period and that exceed a reference threshold, the second historical load indicator is used to indicate an average traffic rate of the AP in the data collection period, and the first historical load indicator and the second historical load indicator are used to describe historical load of the AP; and predicting, based on the historical load indicator of the AP, a predicted load indicator of the AP in the target duration after the current moment, wherein the predicted load indicator comprises one or a combination of a first predicted load indicator and a second predicted load indicator, and the first predicted load indicator and the second predicted load indicator are used to describe the predicted load of the AP, wherein the determining a historical load indicator of the AP based on the radio frequency information of the AP comprises:

in response to the historical load indicator of the AP comprises the second historical load indicator, determining the second historical load indicator of the AP based on the radio frequency information of the AP and the following formula:

$$\text{Load} = \frac{1}{m}\sum speed_n,$$

wherein the speed is the traffic rate of the AP, m is a total quantity of data in the data collection period, n is a positive integer greater than 1 and less than m.

14. The device according to claim 13, wherein the radio frequency information of the AP in the plurality of APs comprises received signal strength indicator (RSSI) information between the AP and each neighboring AP, and user usage data of the AP.

15. The device according to claim 14, wherein the user usage data of the AP comprises data traffic of the AP in the data collection period.

16. The device according to claim 14, wherein the user usage data of the AP comprises channel utilization and an interference rate of the AP in the data collection period.

17. A non-transitory computer-readable storage medium storing at least one instruction that, when executed by one or more processors, causes the one or more processors to implement:

obtaining radio frequency information of a plurality of access points (APs);

for each AP in the plurality of APs, predicting, based on radio frequency information of the AP, a load of the AP in a target duration after a current moment; and allocating a radio frequency resource to each of the plurality of APs based on the predicted loads of the plurality of APs during the target duration, wherein the radio frequency resource comprises one or a combination of a frequency bandwidth and a channel, wherein the predicting, based on radio frequency information of the AP, a load of the AP in a target duration after a current moment comprises:

determining a historical load indicator of the AP based on the radio frequency information of the AP, wherein the historical load indicator comprises one or a combination of a first historical load indicator and a second historical load indicator, the first historical load indicator of the AP is used to indicate a quantity of traffic rates of the AP that are in a data collection period and that exceed a reference threshold, the second historical load indicator is used to indicate an average traffic rate of the AP in the data collection period, and the first historical load indicator and the second historical load indicator are used to describe historical load of the AP; and predicting, based on the historical load indicator of the AP, a predicted load indicator of the AP in the target duration after the current moment, wherein the predicted load indicator comprises one or a combination of a first predicted load indicator and a second predicted load indicator, and the first predicted load indicator and the second predicted load indicator are used to describe the predicted load of the AP, wherein the determining a historical load indicator of the AP based on the radio frequency information of the AP comprises:

in response to the historical load indicator of the AP comprises the second historical load indicator, determining the second historical load indicator of the AP based on the radio frequency information of the AP and the following formula:

$$\text{Load} = \frac{1}{m}\sum speed_n,$$

wherein
the speed is the traffic rate of the AP, m is a total quantity of data in the data collection period, n is a positive integer greater than 1 and less than m.

* * * * *

UNITED STATES PATENT AND TRADEMARK OFFICE
CERTIFICATE OF CORRECTION

PATENT NO.        : 11,576,187 B2  
APPLICATION NO.   : 16/993247  
DATED             : February 7, 2023  
INVENTOR(S)       : Zhenhang Sun et al.

Page 1 of 1

It is certified that error appears in the above-identified patent and that said Letters Patent is hereby corrected as shown below:

In the Claims

• Claim 8, Column 24, Line 49, change "indicator used" to -- indicator is used --;

• Claim 8, Column 24, Line 55, change "AR" to -- AP --;

• Claim 10, Column 25, Lines 53-55, change "wherein the determining a historical load indicator of the AP based on the radio frequency information of the AP comprises:" to -- wherein the allocating a radio frequency resource to each of the plurality of APs based on the predicted loads of the plurality of APs comprises: --;

• Claim 11, Column 26, Lines 46-48, change "wherein the determining a historical load indicator of the AP based on the radio frequency information of the AP comprises:" to -- wherein the allocating a radio frequency resource to each of the plurality of APs based on the predicted loads of the plurality of APs comprises: --.

Signed and Sealed this  
Fourth Day of July, 2023

Katherine Kelly Vidal  
*Director of the United States Patent and Trademark Office*